D. L. WOLFE.
CRANK SHAFT THRUST BEARING.
APPLICATION FILED DEC. 18, 1919.
1,364,420.
Patented Jan. 4, 1921.
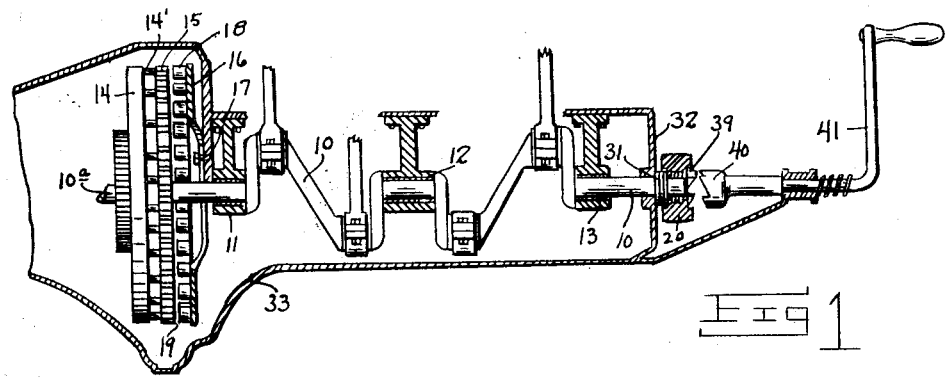
Fig 1
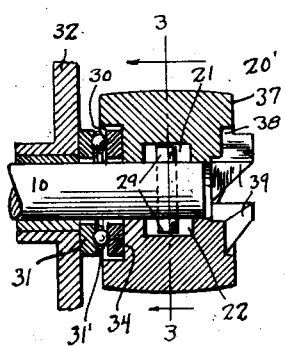
Fig 2
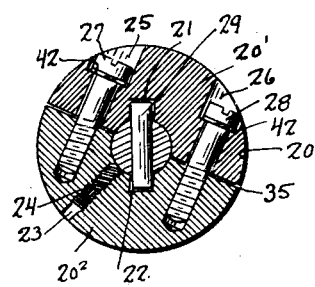
Fig 3
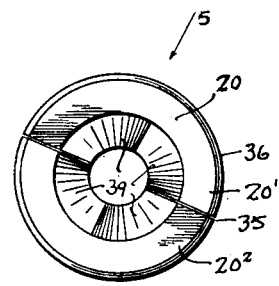
Fig 4
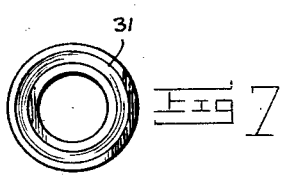
Fig 7
Fig 5
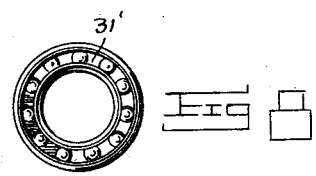
Fig 8
Fig 6
Inventor
Delwin L. Wolfe
By L. L. Westfall
Attorney

UNITED STATES PATENT OFFICE.

DELWIN L. WOLFE, OF ALMIRA, WASHINGTON.

CRANK-SHAFT THRUST-BEARING.

1,364,420.  Specification of Letters Patent.  Patented Jan. 4, 1921.

Application filed December 18, 1919. Serial No. 345,704.

*To all whom it may concern:*

Be it known that I, DELWIN L. WOLFE, a citizen of the United States of America, residing at Almira, in the county of Lincoln and State of Washington, have invented new and useful Improvements in Crank-Shaft Thrust-Bearings, of which the following is a specification.

This invention pertains to thrust bearings and has particular reference to an external bearing on the end of the crank shaft of a gasolene engine, and is especially applicable to the crank shaft of the standard engine of the Ford passenger car. In this car the inner end of the crank shaft not only carries the fly-wheel but also carries the magnets of the magneto on one face of the fly-wheel and a stationary disk adjacent the fly-wheel carries the magneto coils. In order to get satisfactory results from the magneto, it is necessary that the width of the gap between the magnets and the coils should be uniformly maintained and the manufacturers of the car state that this should be just one-thirty second of an inch. This car is further so constructed that a strong clutch spring, when the clutch is disengaged or is in any other working position than in high gear, pulls outwardly on the fly-wheel, thereby wearing the shoulders of the bearings of the crank shaft and gradually widening the gap between the magnets and the coils of the magneto, whereby the efficiency of the magneto is constantly lessening with the continued use of the car. The outer end of the crank shaft, to which the thrust bearing must be attached, must also carry a pulley for the fan belt and one side of a clutch for manually cranking or starting the engine.

The purpose of this invention is to construct a thrust bearing that is adjustable on the end of the crank shaft so as to hold the crank shaft in a fixed longitudinal position in order to maintain the uniform width of gap between the magnets and the coils that is necessary to get the best results in providing the spark for the engine ignition. It is a further purpose of the invention to provide, integral with the thrust bearing, a pulley for the fan belt and one side of a clutch for manually turning the crank shaft to start the engine. I have accomplished these purposes by the construction hereinafter particularly described and illustrated in the accompanying drawings in which, Figure 1, is a broken-away longitudinal sectional view of a gasolene engine, showing particularly the crank shaft in elevation and the improved bearing construction in section.

Fig. 2, is an enlarged sectional view of the improved bearing shown in position on a broken-away portion of the crank shaft and resting against a broken-away portion of the engine casing.

Fig. 3, is a sectional view taken on the line 3—3 of Fig. 2.

Fig. 4, is a front elevation of the improved bearing.

Fig. 5, is a plan view of the improved bearing looking in the direction of the arrow, Fig. 4.

Fig. 6, is a plan view of the lower half of the bearing.

Fig. 7, is a plan view of a ball race forming a part of a ball bearing inserted on the crank shaft between the improved bearing and the casing of the engine, and, Fig. 8, is a plan view of the cage portion of such bearing, the same carrying the balls.

In a detail description in which like numerals refer to like parts throughout the several views, the crank shaft 10, has three main bearings 11, 12 and 13. The fly-wheel 14 is carried by the end $10^1$ of the crank shaft 10, and on the face $14^1$ of the fly-wheel 14 are mounted the magnets 15. The stationary disk 16 is secured to the engine casing as at 17 and carries the coils 18 whereby the magnets 15 and coils 18 are brought to facing position with each other and in spaced relation leaving a narrow gap 19 therebetween.

Having in mind the three functions that the invention must perform as stated in the preamble hereto, namely of serving as a rigid, adjustable collar for the end of the crank shaft, serving as a pulley for the fan belt and as one side of a clutch for manually turning the crank shaft to start the engine, I will now describe the improved construction.

The collar 20 is split into two parts $20^1$ and $20^2$, as near halves as may be. In the part $20^1$ is provided an inner cavity 21 and in the part $20^2$ is provided an inner cavity 22, one cavity being opposite the other when the two parts are brought together as shown in Fig. 3. The part $20^2$ is also provided with a cavity 23 in which is mounted a safety set screw 24 adapted to bear against the shaft 10. Cavities 25 and 26 extend through the part $20^1$ and into the part $20^2$, into which are inserted cap screws 27 and 28 respectively, the same being threaded into the part $20^2$ only. Spring washers 42 are inserted underneath the caps of the screws 27 and 28. A pin 29 extends diametrically through the shaft 10 and reaches outwardly for a distance on each side of the shaft as shown in Figs. 2 and 3. This pin 29 extends into the cavities 21 and 22 of the parts $20^1$ and $20^2$ respectively. The parts $20^1$ and $20^2$ are hollowed out on one face, forming a cavity as at 30.

When the parts are assembled and in place, they are as shown in Fig. 2, the ball race 31 bearing against the vertical end wall 32 of the engine casing 33, the ball race 34 occupying the cavity 30 in the parts $20^1$ and $20^2$ with the cage $31^1$ therebetween carrying the balls and the parts $20^1$ and $20^2$ rigidly engaging the shaft 10, the pin 29 extended into the cavities 21 and 22 and the set screw 24 bearing against the shaft 10. It is intended that the shaft 10 shall hold the parts $20^1$ and $20^2$ slightly separated forming a gap 35 therebetween in order to give a greater purchase to the screws 27 and 28 to hold the parts rigid to the shaft 10. When assembled the parts $20^1$ and $20^2$ have a peripheral surface 36, Fig. 4, that is smooth and round so that the same is available as a pulley for the fan belt of the engine. The face 37 of the parts $20^1$ and $20^2$ is formed when assembled so as to have shoulders 38 and outwardly extending dogs 39 to form one side of a clutch to co-act with the part 40 of the crank 41 thereby forming a clutch for the manual turning of the crank shaft 10. I reserve the right to dispense with the ball bearings comprising the parts 31 and 34 and to fit the improvement to the face of the vertical wall 32. The cavities 21 and 22 are of sufficient length in cross-section, as shown in Fig. 2, to permit of all necessary longitudinal adjustment of the improvement to the crank shaft 10 to maintain at all times a uniform and proper gap 19 between the magnets 15 and the coils 18.

What I claim is:

A crank shaft thrust bearing comprising a split collar longitudinally adjustable on the shaft and rigidly securable thereto, the periphery of the collar being round and flat in cross-section to form a pulley and means on the face of the collar for engagement by a crank to manually turn the shaft.

In testimony whereof I affix my signature in presence of two witnesses.

DELWIN L. WOLFE.

Witnesses:
L. L. WESTFALL,
H. M. BERKEY.